United States Patent
Hatch et al.

(10) Patent No.: US 11,014,517 B2
(45) Date of Patent: May 25, 2021

(54) VEHICLE ACCESSORIES

(71) Applicant: TAP Worldwide, LLC, Compton, CA (US)

(72) Inventors: Thomas M Hatch, Descanso, CA (US); Troy S Unger, El Cajon, CA (US); Joseph C Uhde, Cambridge, MA (US)

(73) Assignee: TAP WORLDWIDE, LLC, Compton, CA (US)

( * ) Notice: Subject to any disclaimer, the term of this patent is extended or adjusted under 35 U.S.C. 154(b) by 154 days.

(21) Appl. No.: 16/169,625

(22) Filed: Oct. 24, 2018

(65) Prior Publication Data

US 2019/0126872 A1 May 2, 2019

Related U.S. Application Data

(60) Provisional application No. 62/577,839, filed on Oct. 27, 2017.

(51) Int. Cl.
| | |
|---|---|
| *B60R 19/48* | (2006.01) |
| *B60R 3/02* | (2006.01) |
| *B60R 19/24* | (2006.01) |
| *B66D 1/00* | (2006.01) |
| *B62D 25/16* | (2006.01) |
| *B60R 11/00* | (2006.01) |
| *B60R 19/18* | (2006.01) |

(52) U.S. Cl.
CPC ............... *B60R 19/48* (2013.01); *B60R 3/02* (2013.01); *B60R 11/00* (2013.01); *B60R 19/24* (2013.01); *B62D 25/16* (2013.01); *B66D 1/00* (2013.01); *B60R 2011/004* (2013.01); *B60R 2019/1886* (2013.01); *B60R 2019/247* (2013.01)

(58) Field of Classification Search
CPC ........ B60R 19/48; B60D 1/485; B60D 1/488; B60D 1/56; B60D 1/565
See application file for complete search history.

(56) References Cited

U.S. PATENT DOCUMENTS

| | | | |
|---|---|---|---|
| 6,702,347 B1 * | 3/2004 | Hollinger | B60D 1/185 293/102 |
| D814,984 S * | 4/2018 | Wymore | D12/169 |
| 10,625,995 B2 * | 4/2020 | Vaughn | B66D 1/16 |
| D889,345 S * | 7/2020 | Harriton | D12/196 |
| 2011/0006553 A1 * | 1/2011 | Fretz | B60R 19/52 293/115 |
| 2011/0049914 A1 * | 3/2011 | Beaird, III | B66D 1/28 293/115 |
| 2014/0001427 A1 * | 1/2014 | Fretz | B66D 1/02 254/342 |

(Continued)

*Primary Examiner* — Jason S Morrow
(74) *Attorney, Agent, or Firm* — Harness, Dickey & Pierce, P.L.C.

(57) ABSTRACT

A bumper assembly is provided for a vehicle having a frame. The bumper assembly includes a winch cradle defining a cradle mounting aperture corresponding to a first frame aperture of the frame. A bumper member is configured to at least partially surround the winch cradle and extend laterally from the winch cradle across a portion of the vehicle. The bumper member defines a bumper mounting aperture corresponding to a second frame aperture. The winch cradle is configured to couple to the vehicle frame independent of the bumper member and the bumper member is configured to couple to the vehicle frame independent of the winch cradle.

7 Claims, 16 Drawing Sheets

(56) References Cited

U.S. PATENT DOCUMENTS

| | | | |
|---|---|---|---|
| 2014/0021328 A1* | 1/2014 | Higgs | B66D 1/00 |
| | | | 248/674 |
| 2014/0224853 A1* | 8/2014 | Griese | B60R 11/00 |
| | | | 224/544 |
| 2018/0147901 A1* | 5/2018 | Cramp | B60R 19/34 |
| 2019/0127190 A1* | 5/2019 | Fretz | B66D 1/38 |

* cited by examiner

VEHICLE ACCESSORIES

The present invention relates to vehicles and vehicle accessories. More particularly, the invention relates to an adaptive bumper system for the selective installation of a winch on vehicles, to a rear step assembly for attachment to a vehicle bumper and to an accessory-compatible fender assembly for a vehicle.

BACKGROUND

Certain types of vehicles, such as trucks, SUVs, and UTVs, are often used with a winch. The winch may be mounted to the front bumper or to a frame member adjacent the front bumper.

Certain types of vehicles, such as trucks and SUVs have relatively high ground clearance. When combined with an elevated bed or roof-rack, the height of the truck or SUV can make access to cargo in the bed or roof-rack difficult to access.

The attachment of spot lights, aftermarket mirrors and other accessories trucks and SUVs is a popular hobby and way to increase the utility of such vehicles in specific environments.

SUMMARY

According to an illustrative embodiment of the present disclosure, a bumper assembly is provided for a vehicle having a frame. The bumper assembly includes a winch cradle defining a cradle mounting aperture corresponding to a first frame aperture of the frame. A bumper member is configured to at least partially surround the winch cradle and extend laterally from the winch cradle across a portion of the vehicle. The bumper member defines a bumper mounting aperture corresponding to a second frame aperture. The winch cradle is configured to couple to the vehicle frame independent of the bumper member and the bumper member is configured to couple to the vehicle frame independent of the winch cradle.

According to another illustrative embodiment of the present disclosure, a vehicle step assembly for use with a rear bumper of a vehicle, comprises a base portion configured to be fixedly coupled to the rear bumper. The base portion defines mounting apertures for fastening the base portion to the rear bumper assembly and a tubular body. A step extension member is slidably received within the tubular body. The step extension member has a distal end and defines a plurality of height adjustment apertures corresponding to a plurality of discrete positions of the step extension member relative to the base portion. A step platform is fixedly coupled to the distal end. A bolt assembly is coupled to the base portion and selectively extends through a height adjustment aperture to selectively fixedly couple the step extension member to the base portion in each of the plurality of discrete positions.

According to yet another illustrative embodiment of the present disclosure, a multifunction upper fender assembly is configured to replace an original equipment upper fender on a vehicle. The multi-function upper fender assembly comprises an upper fender body configured to be coupled adjacent a hood and windshield of the vehicle. A back surface of the upper fender body defines at least one mounting aperture for coupling the upper fender body to the vehicle. A mounting surface is coupled to the upper fender body. The mounting surface defines a mounting point for at least one vehicle accessory. A detachable cover member is disposed between the mounting surface and the upper fender body.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Figure 1:
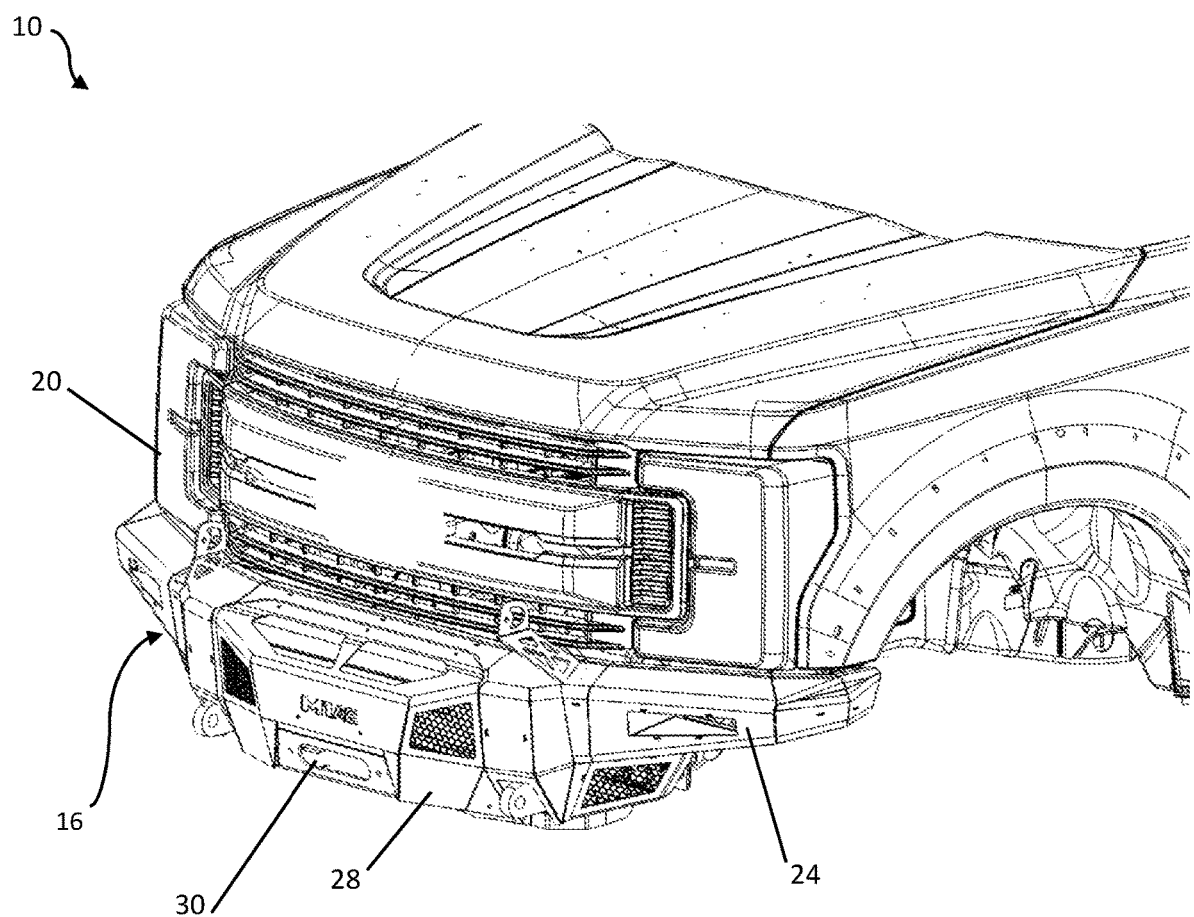
FIG. 1 is a front left perspective view of a truck coupled to a bumper assembly of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. For example, while the following description refers primarily to a truck bumper, it should be understood that the principles of the invention apply equally to other on and off road vehicles. While the present invention primarily involves a truck bumper, it should be understood, however, that the invention may have application to other types of vehicles, such as SUVs, ATVs, utility vehicles, golf carts, etc.

Referring to FIG. 1, a vehicle 10, more specifically, a pickup truck 10 is shown. A bumper assembly 16 is coupled to a front portion 20 of the truck 10. In the illustrated embodiment, the bumper assembly 16 includes a bumper member 24, a bumper facia 28, and a winch cradle 30 disposed behind the bumper facia 28.

Figure 2:
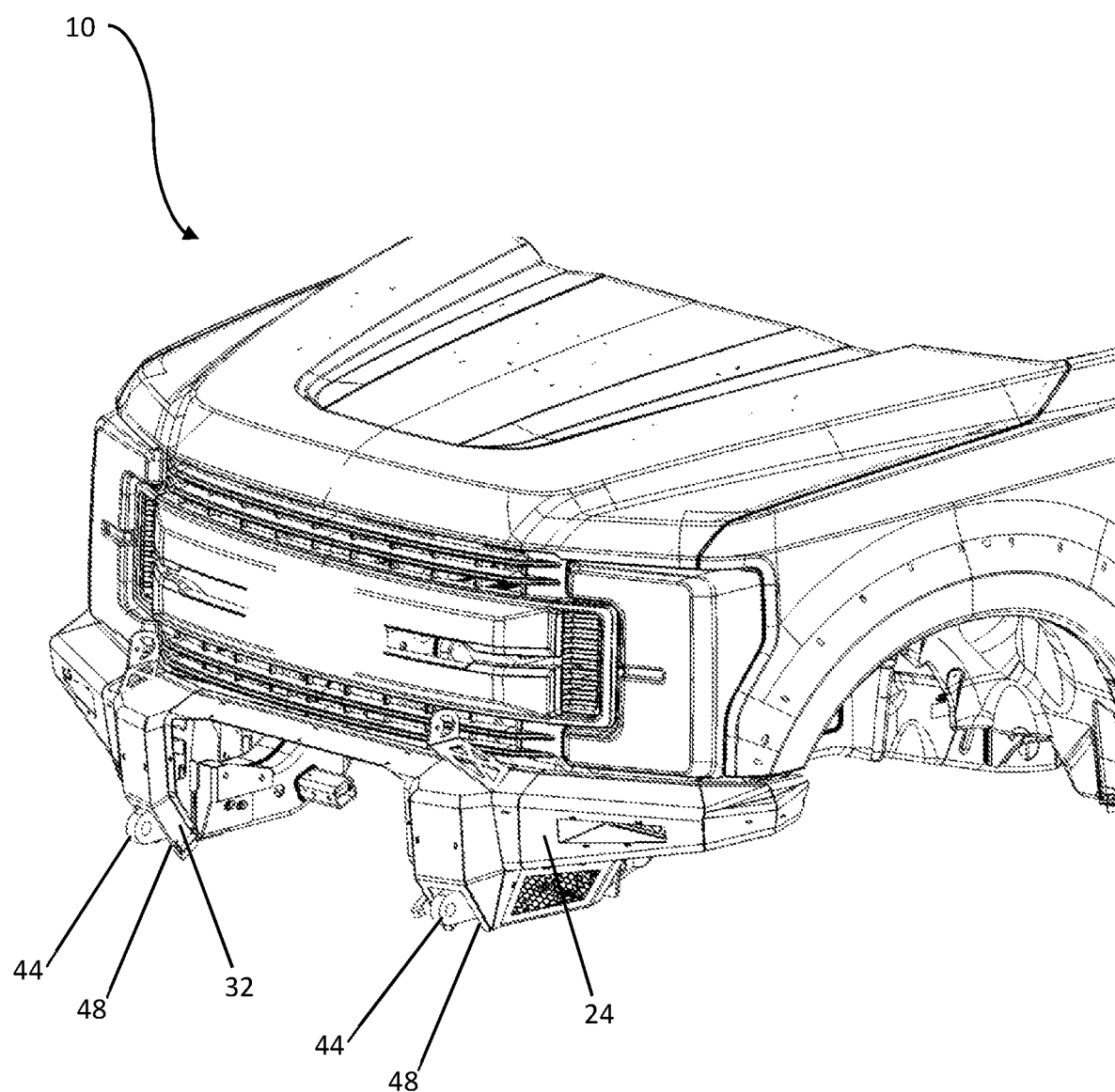
FIG. 2 is a front left perspective view of the truck of FIG. 1, with a portion of the bumper assembly removed.
Figure 3:
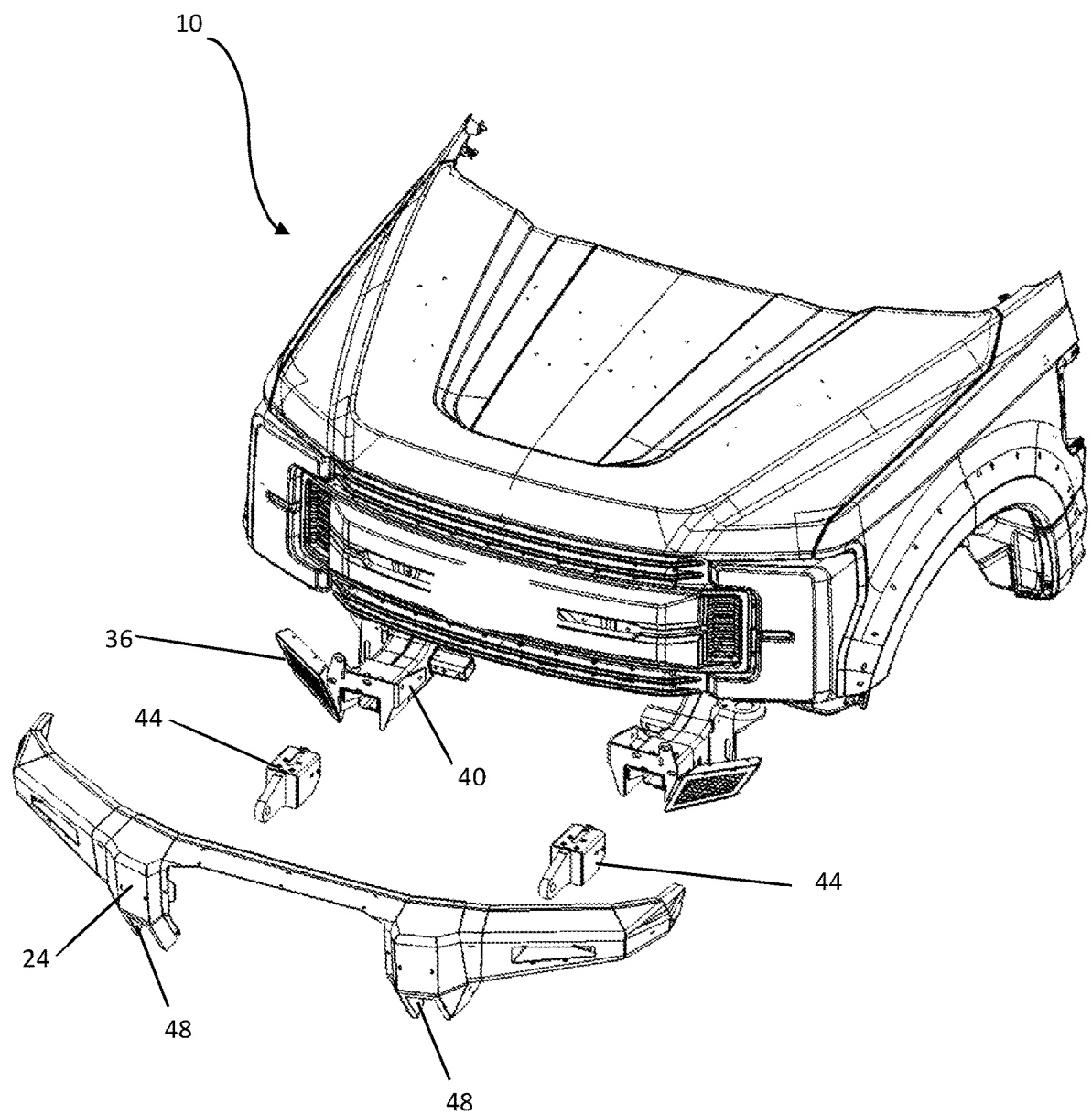
FIG. 3 is an upper front left exploded view of the truck and bumper assembly of FIG. 2.

Referring to FIG. 2, with the bumper facia 28 and winch cradle 30 removed, the bumper member 24 defines a three-sided opening 32. Referring to FIG. 3, the bumper member 24 is coupled to existing mounting holes 36 defined by a frame 40 of the truck 10. D-rings 44 are similarly mounted to mounting locations on the frame 40. Referring back to FIG. 2, the D-rings 44 extend through cutouts 48 in the bumper member 24 so that the D-rings 44 remain accessible.

Figure 4:
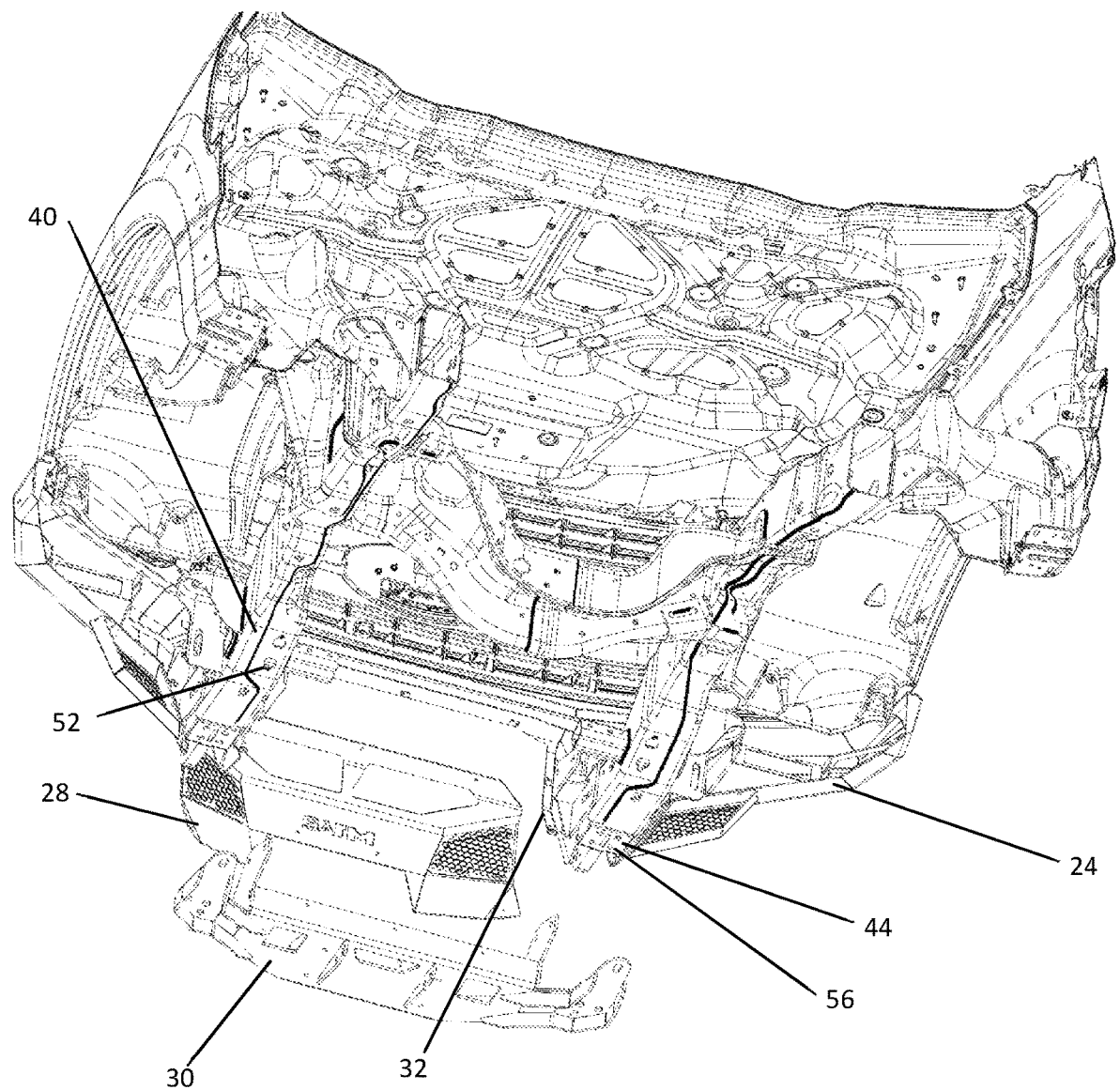
FIG. 4 is a lower exploded perspective view of the truck of FIG. 1, showing mounting positions of a winch cradle and front facia.
Figure 5:
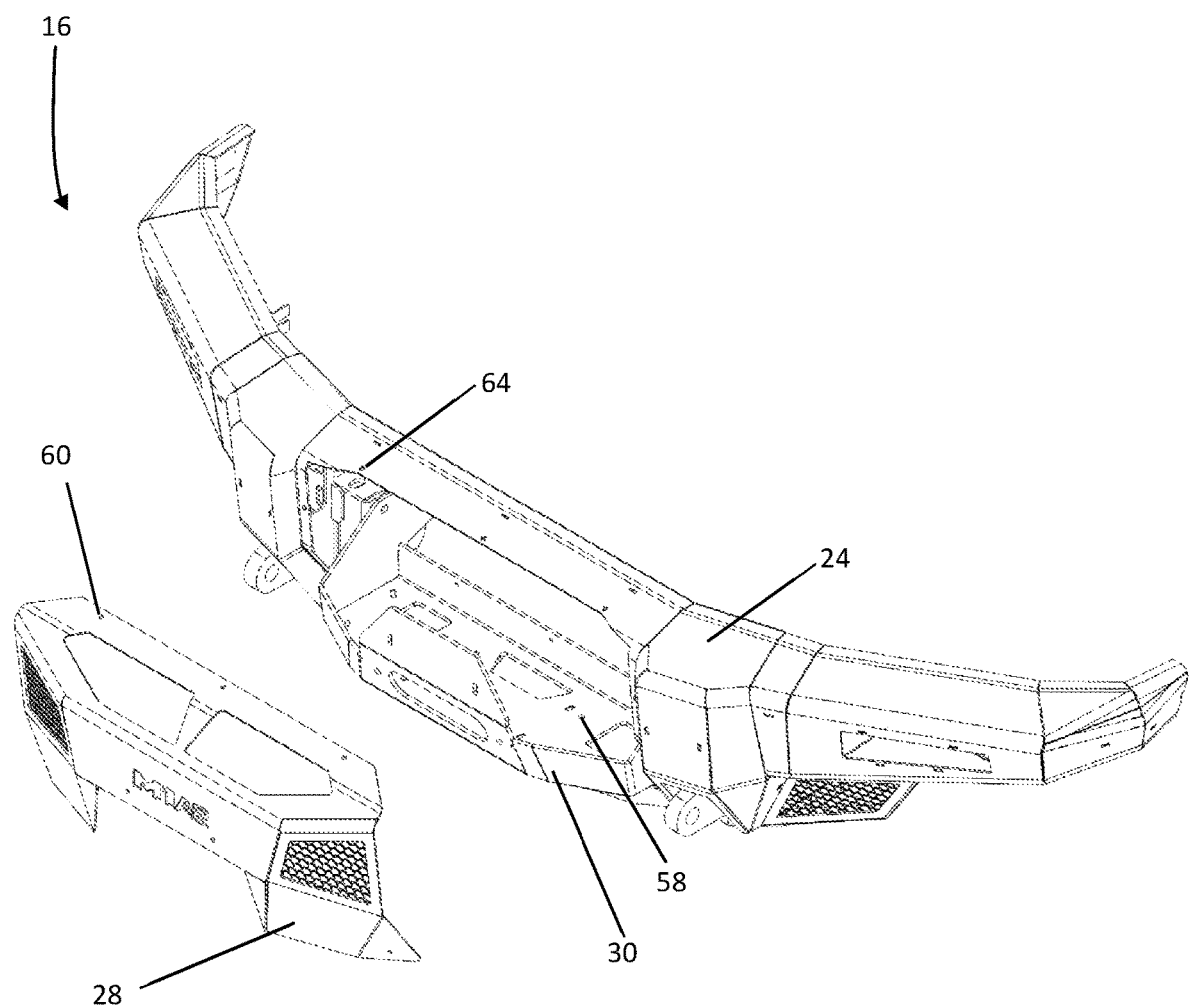
FIG. 5 is a perspective view of the bumper assembly of FIG. 10, with the winch cradle in a position of installation and the front facia removed.

Referring to FIG. 4, the winch cradle 30 mounts to existing holes 52 in the frame 40 and existing holes 56 in the D-rings 44. The winch cradle 30 is not directly mounted to the bumper member 24, thus allowing its removal or installation without removal of the bumper member 24. Referring to FIG. 5, the cradle 30 provides a variety of pointing points 58 for attaching an optional winch or other vehicle accessory (not shown). The front facia 28 is coupled to the bumper member 24 via corresponding apertures 60, 64 defined in the front facia 28 and bumper member 24, respectively.

Figure 6:
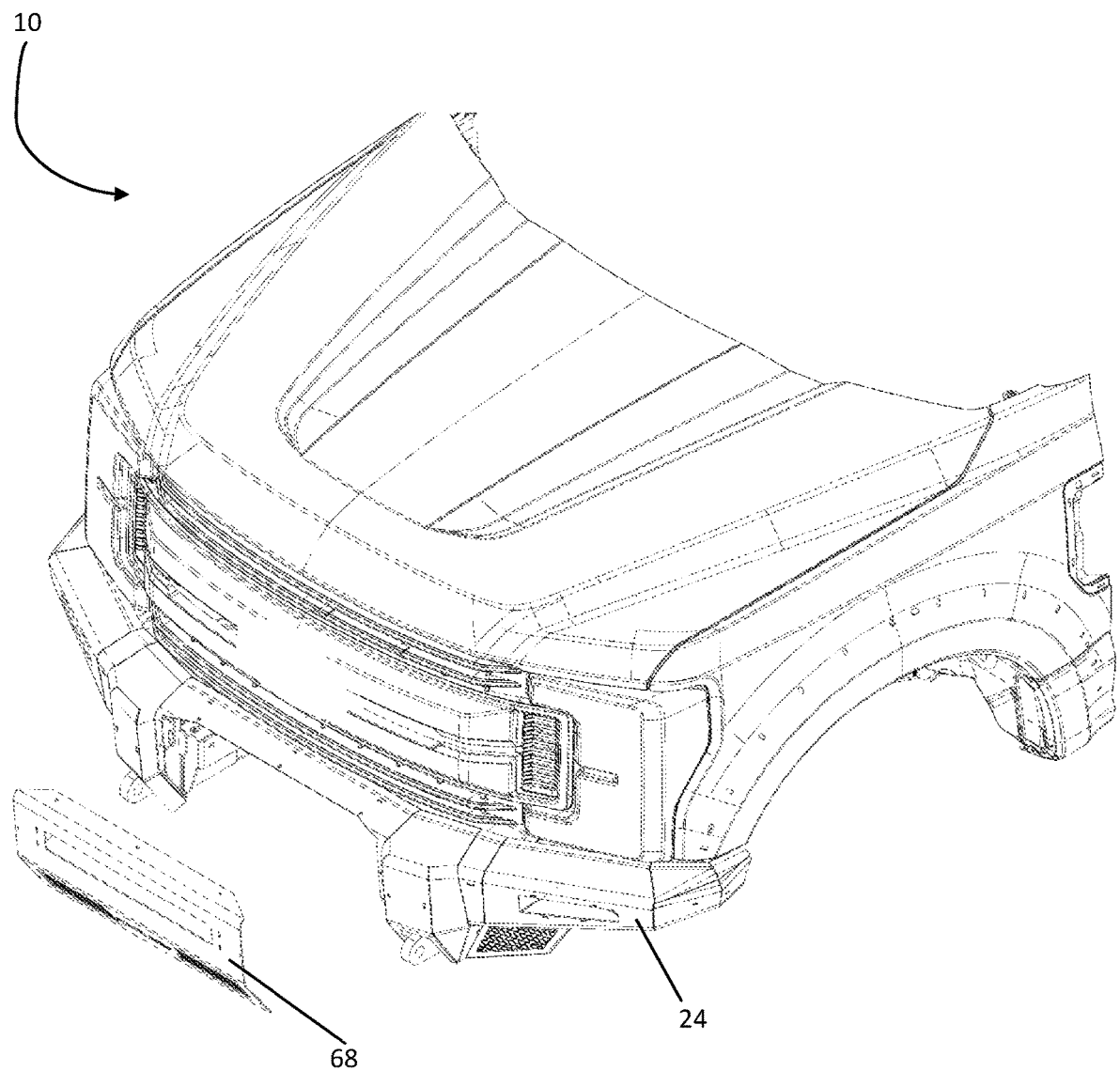
FIG. 6 is an upper front left exploded view of the truck of FIG. 2 with an alternative front facia.
Figure 7:
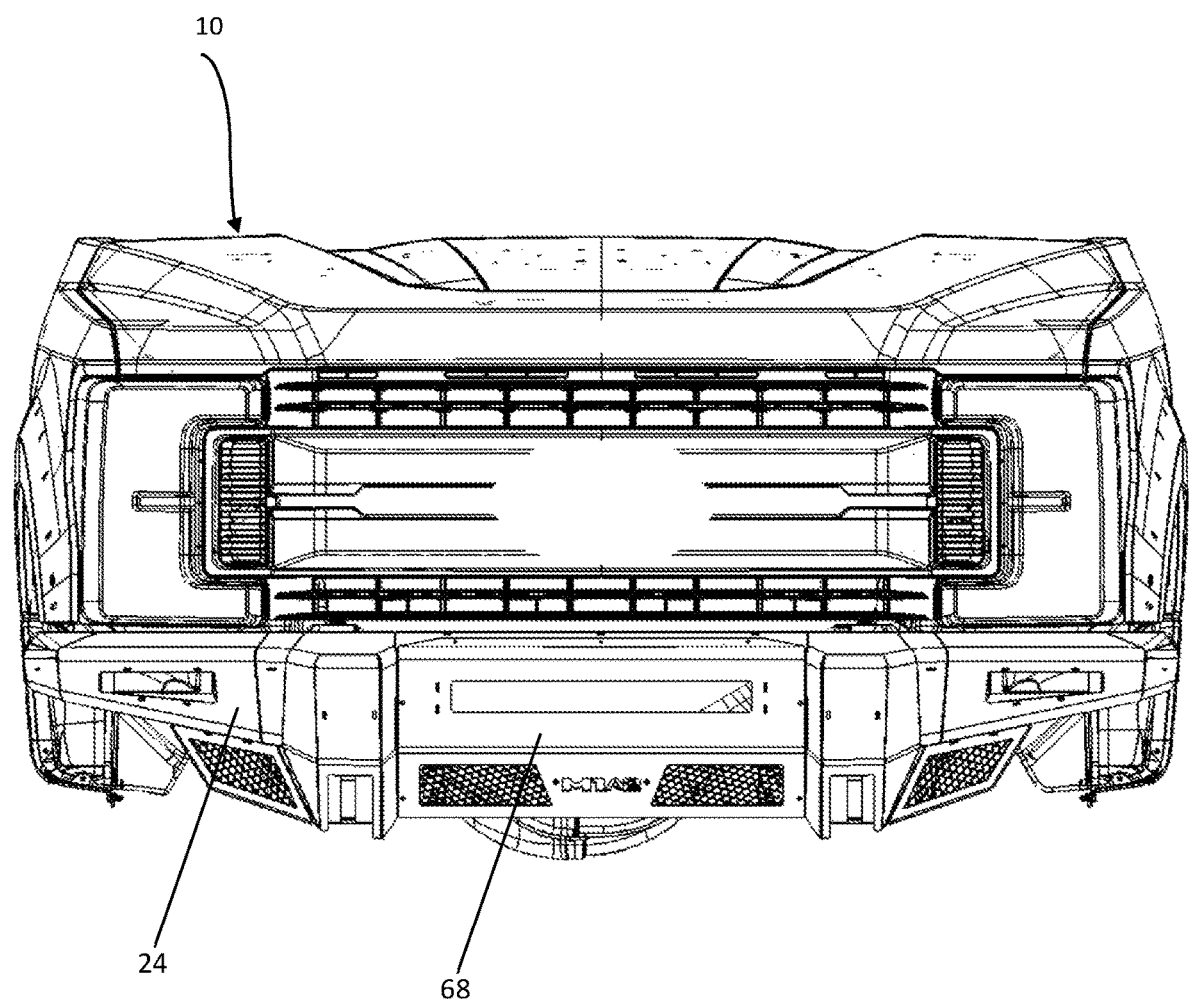
FIG. 7 is a front view of the truck with the front facia of FIG. 5 in an installed position.

Referring to FIG. 6, an alternative front facia 68 is provided for use without the winch cradle of FIG. 5. The front facia 68 mounts similarly to the front facia 28 to the bumper member 24. Referring to FIG. 7, the alternative front facia 68 provides a different appearance from the front facia 28 of FIG. 1 and similarly covers the three-sided opening 28.

Figure 8:
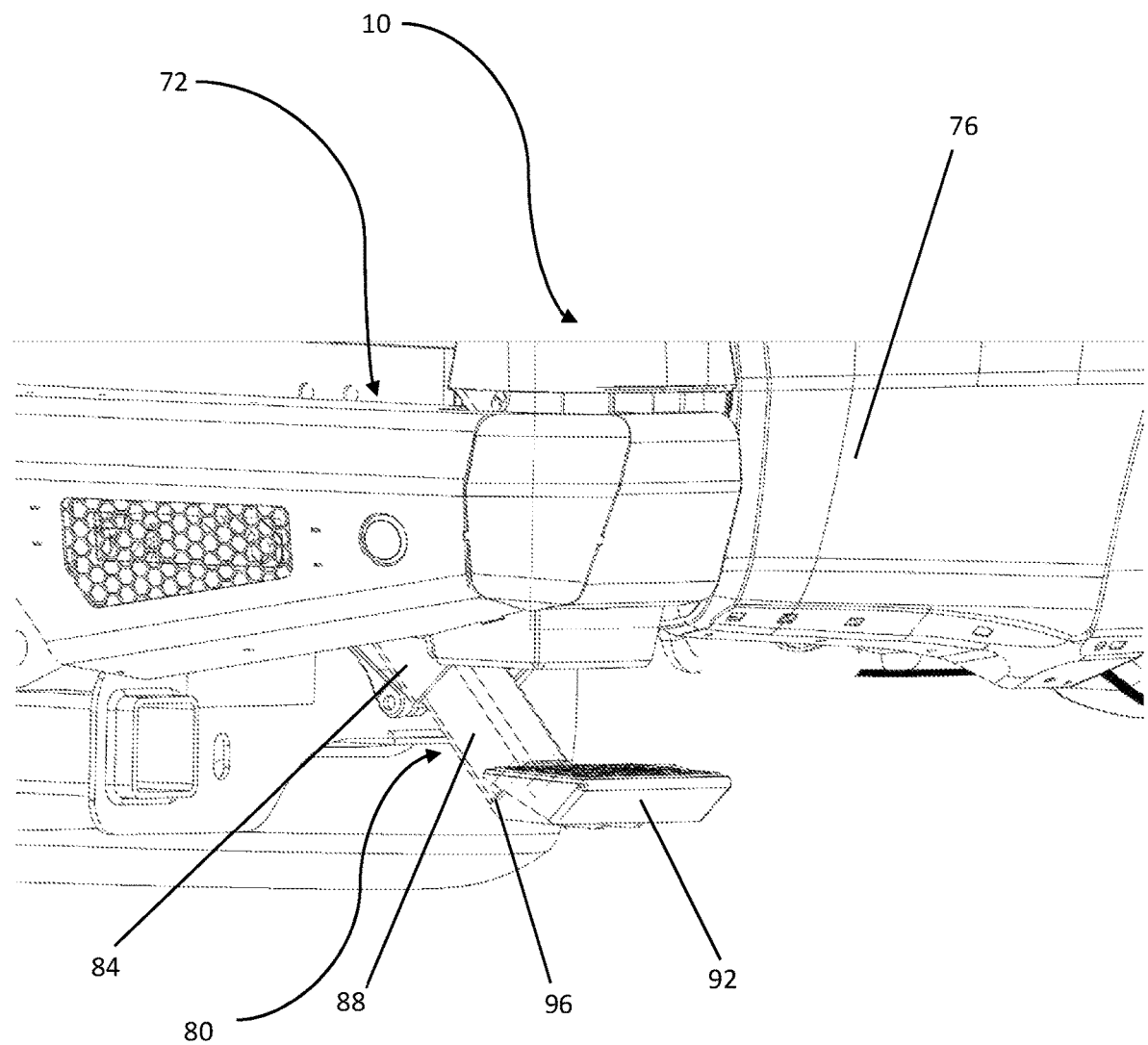
FIG. 8 is a rear perspective view of a portion of a truck and a bumper step assembly according to the present disclosure, with the bumper step in an extended position.
Figure 9:
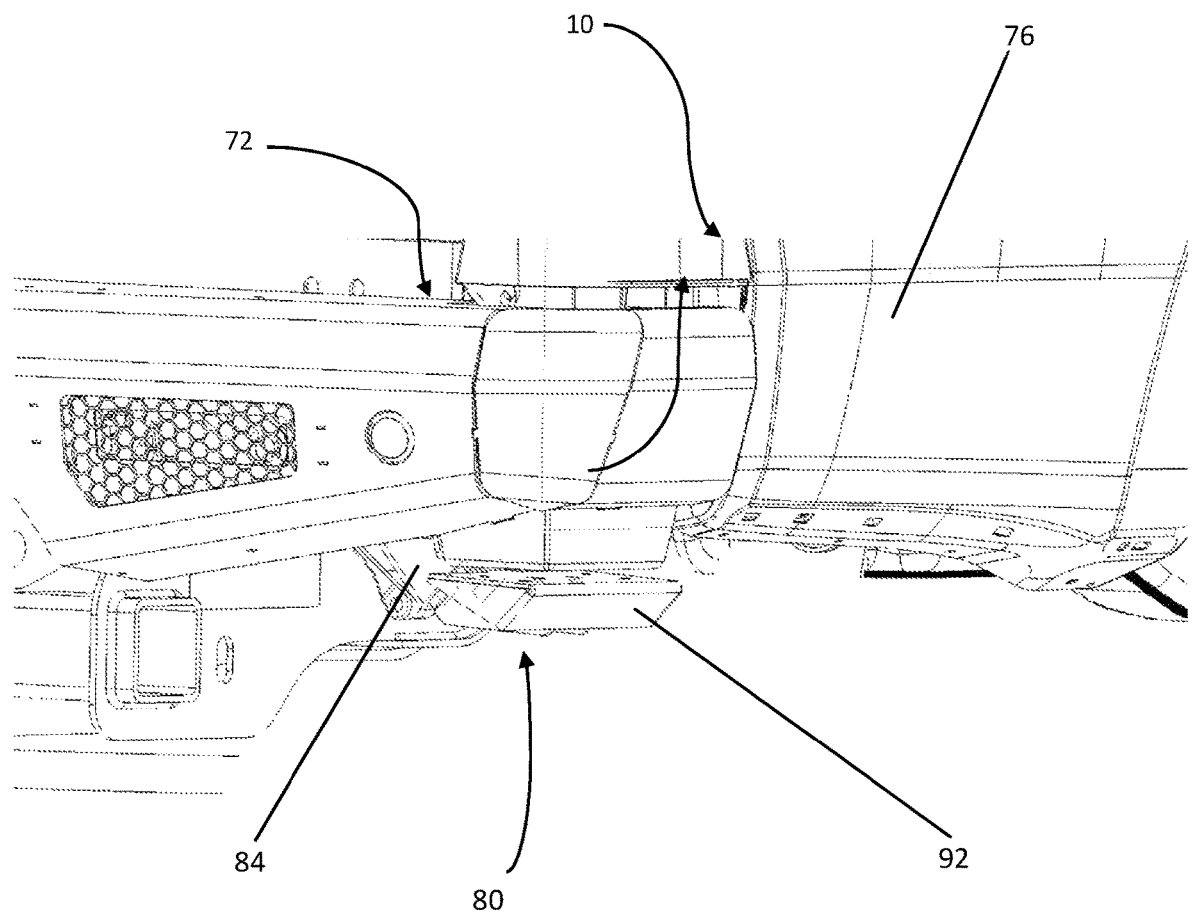
FIG. 9 is a rear perspective view of the truck and bumper step assembly of FIG. 8, with the bumper step in a retracted position.

Referring to FIG. 8, another aspect of the present disclosure is shown. More specifically, a rear bumper assembly 72 coupled to a rear portion 76 of the truck 10. A bumper step assembly 80 is coupled to the rear bumper assembly 72. The bumper step assembly 80 includes a base portion 84 that is fixedly coupled rear bumper assembly 72. Referring to FIG. 8, a step extension 88 is extendably and, referring to FIG. 9, retractably coupled to the base portion 84. A step platform 92 is coupled to a distal end 96 of the step extension 88. The step platform 92 is configured to support a user's foot or feet to allow the user to stand on the step and elevate them above the ground supporting the vehicle 10.

Figure 10:
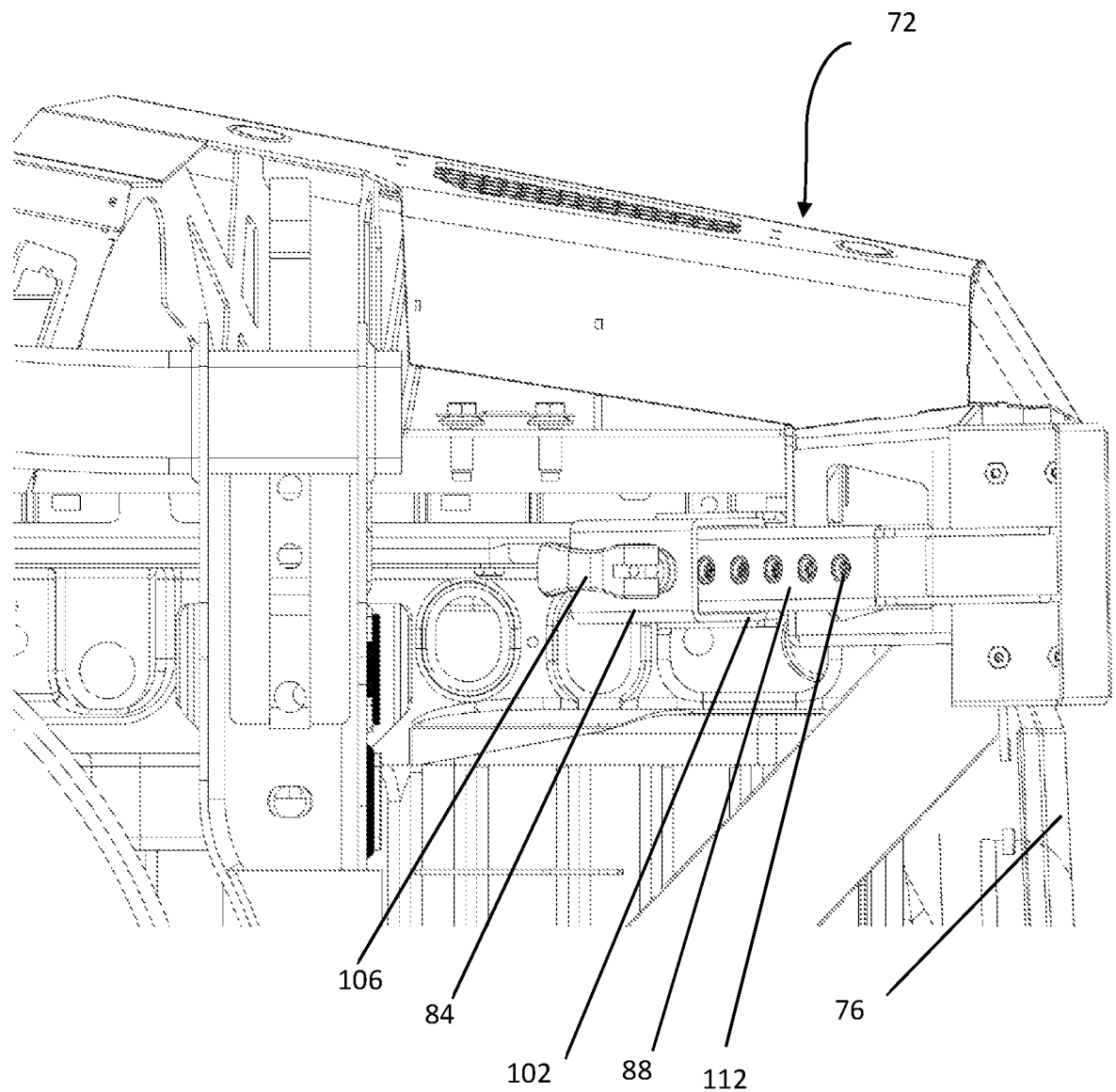
FIG. 10 is a bottom view of the truck and bumper step assembly of FIG. 8, with the bumper step in the extended position.
Figure 11:
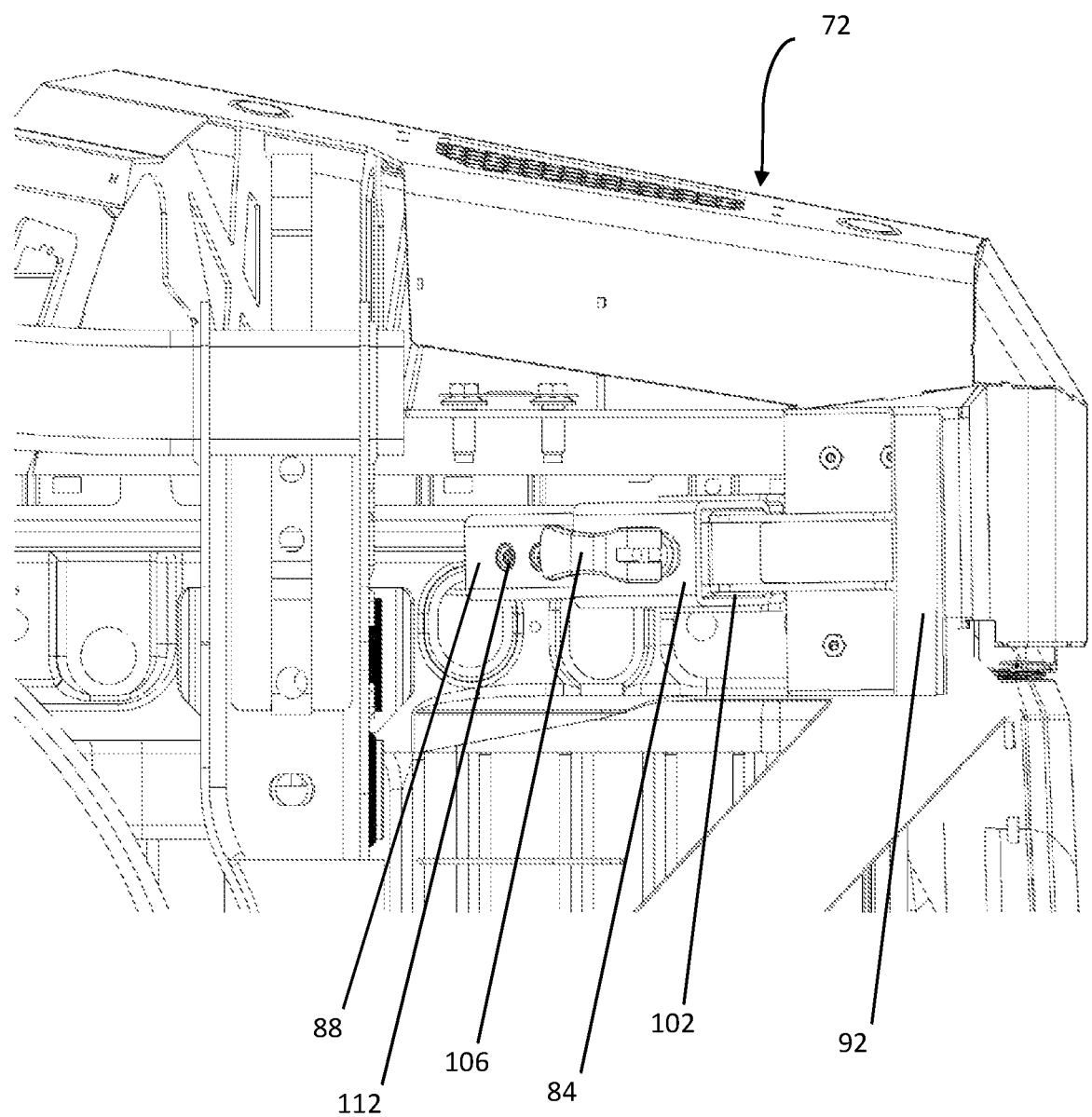
FIG. 11 is a bottom view of the truck and bumper step assembly of FIG. 8, with the bumper step in the retracted position.

Referring to FIG. 10, the base portion 84 defines a substantially square cross-section aperture 102 corresponding to a square cross section 104 (FIG. 12) of the step extension 88. Referring back to FIG. 10, a clamping-bolt 106 is coupled to the base portion 84 via a rivet nut, "nutsert", or weld-nut. The clamping-bolt 106 selectively engages height adjustment apertures 112 defined in the step extension 88. Each of the plurality of apertures 112 corresponds to a position of height adjustment of the step platform 92 between the fully extended position of FIGS. 8 and 10, and the fully retracted position of FIGS. 9 and 11. In the illustrated embodiment, the step extension 88 defines six height adjustment apertures 112, corresponding to six discrete positions with approximately 6 inches of vertical height adjustment between the fully extended position of FIGS. 8 and 10 and the fully retracted position of FIGS. 9 and 11. In other embodiments, more or fewer adjustment apertures may be provided, and greater or less height adjustment travel.

In other embodiments, the clamping-bolt 106 may be replaced by other removable pin arrangements, or other positioning mechanisms.

Figure 12:
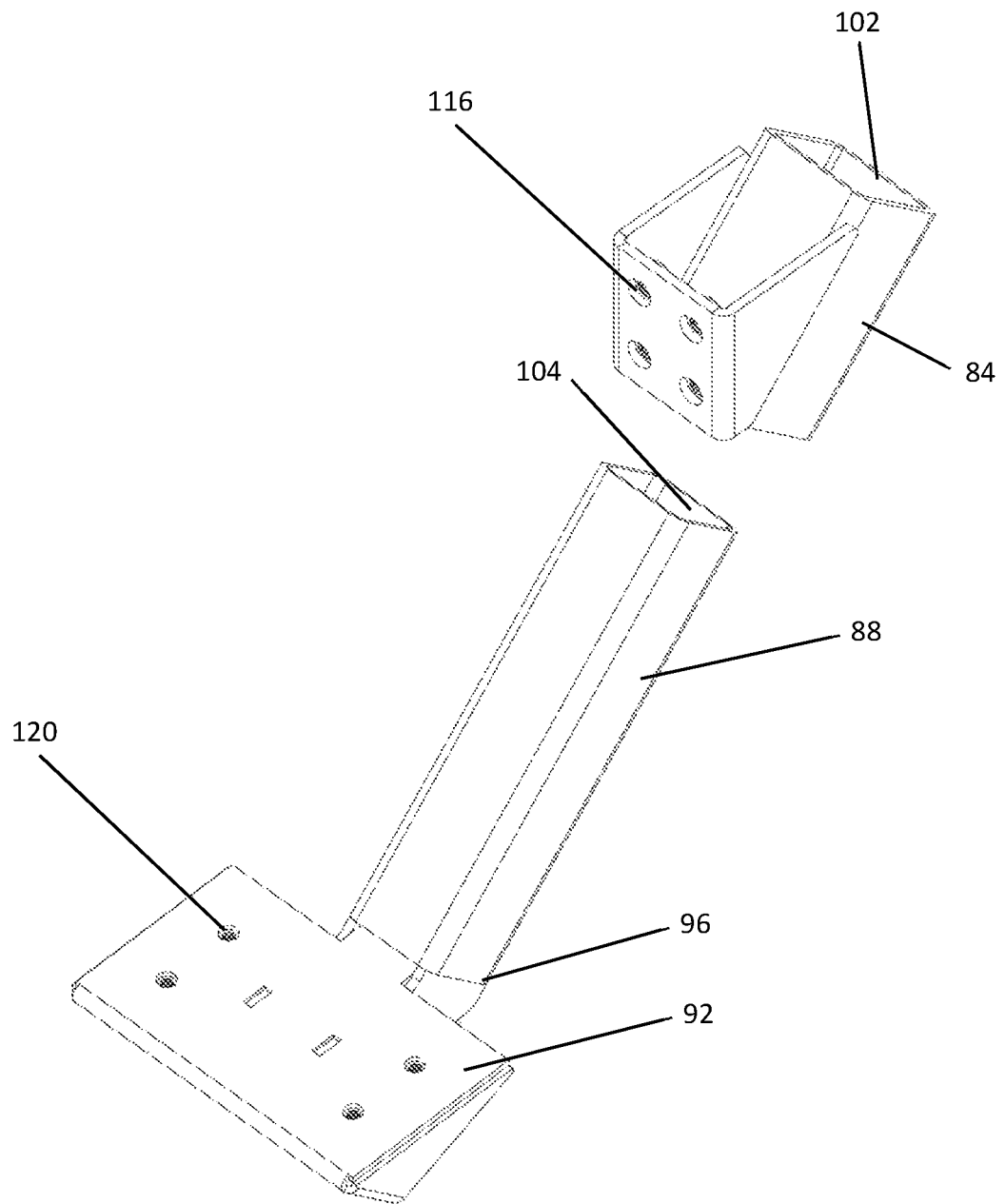
FIG. 12 is an exploded view of portions of the bumper step assembly of FIG. 8.

Referring to FIG. 12, the base portion 84 defines four mounting apertures 116 for mounting the base portion to the rear bumper assembly 72. In other embodiments, the base portion may be mounted directly to the frame of a vehicle, rather than to the bumper. The step platform 92 defines a plurality of mounting holes 120 for optionally attached tread material, such as rubber, or an abrasive material, for reducing the risk of slipping from the step platform 92.

The bumper step assembly 80 is intended to aid in accessing the truck bed, especially in cases of taller and lifted trucks. In addition to providing access, it can be used in other instances, where an added step is needed. The step platform 92 is removable by either removing it by the base portion or removing the sliding step extension 88 and clamping bolt 106.

Figure 13:
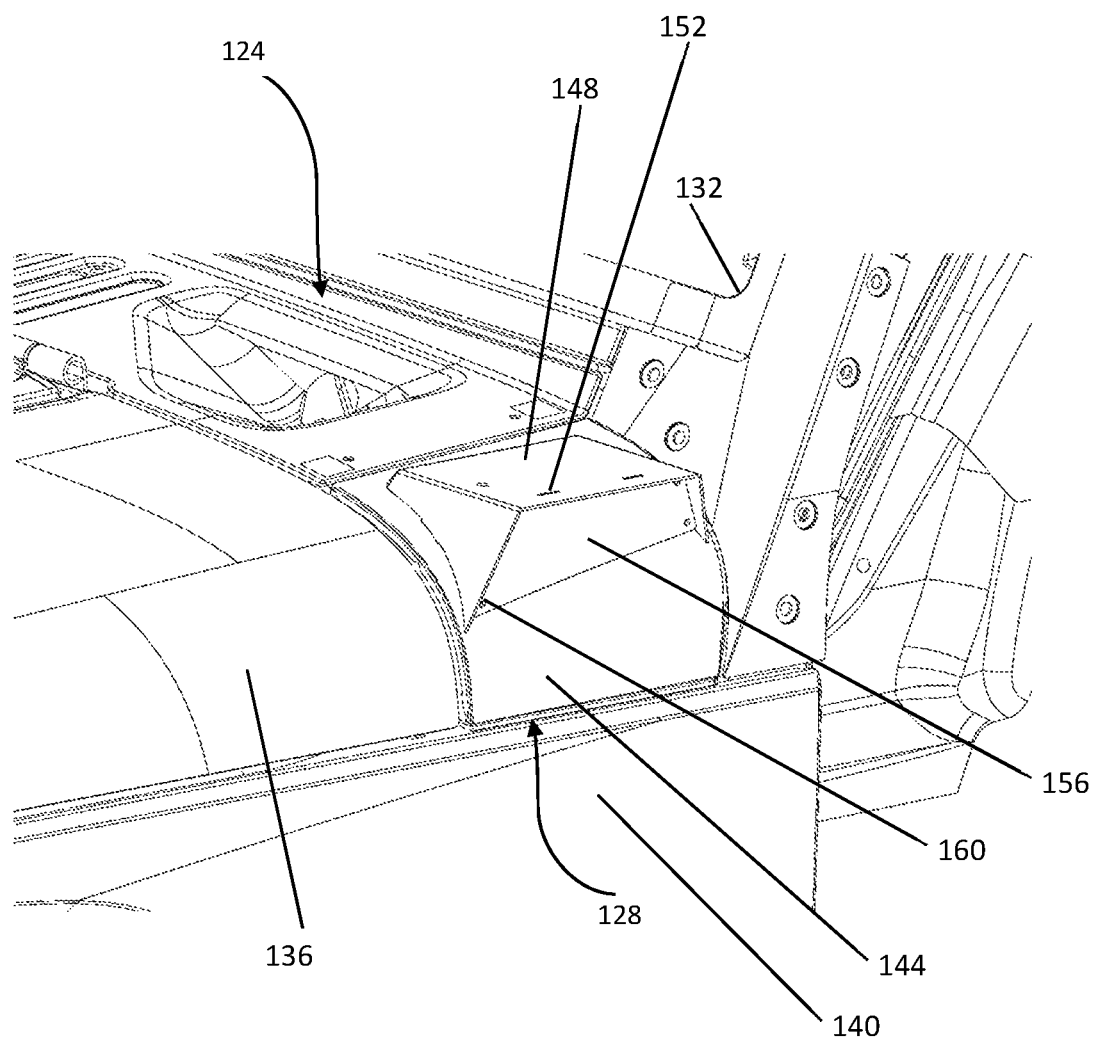
FIG. 13 is a perspective view of a portion of an SUV coupled to an upper fender according to the present disclosure.

Referring to FIG. 13, another aspect of the present disclosure is illustrated. A portion of a vehicle 124, more specifically a sport utility vehicle (SUV) 124, and even more specifically a JEEP WRANGLER, is shown. A multi-function upper fender assembly 128, according to the present disclosure, is attached to the SUV 124 between a windshield 132, a hood 136, and the driver's side fender 140 of the SUV 126. A similar multi-function upper fender assembly may be provided between the windshield 132, hood, and passenger side fender (not shown).

The multifunction upper fender assembly 128 includes an upper fender body 144. A substantially horizontal, flat mounting surface 148 is coupled to the upper fender body 144. A plurality of mounting apertures 152, for the attachment of various accessories by a user, are defined in the flat mounting surface 148. Such accessories may include a spotlight, speakers, or other user-selected accessories.

Figure 14:
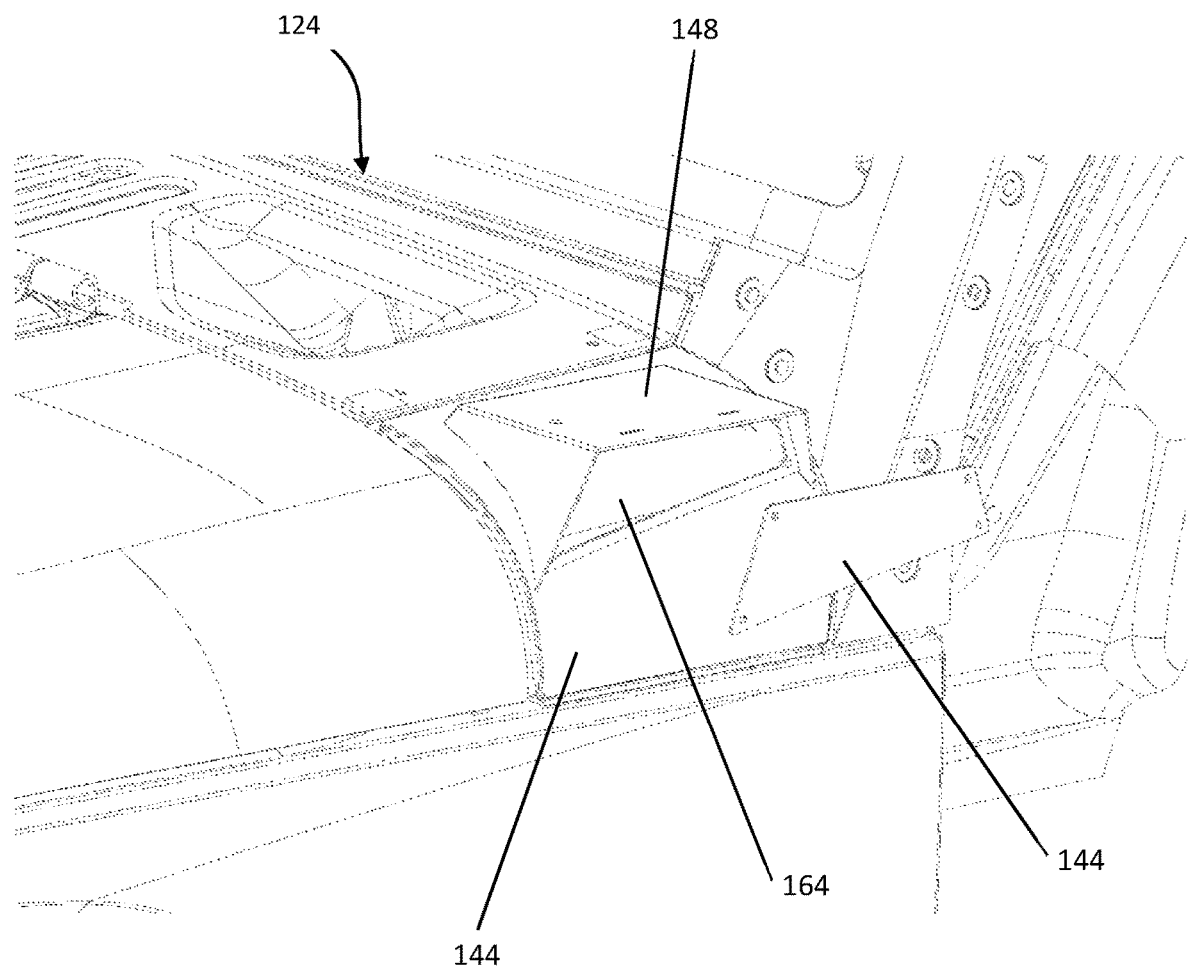
FIG. 14 is a perspective view of the SUV and upper fender of FIG. 12, with a cover of the upper fender removed.

A removable cover member 156 is coupled between the upper fender body 144 and the mounting surface 148 by a plurality of fasteners 160. Referring to FIG. 14, with the cover member 156 removed, access is provided to an opening 164 beneath the mounting surface 148 through which wires may be routed.

Figure 15:
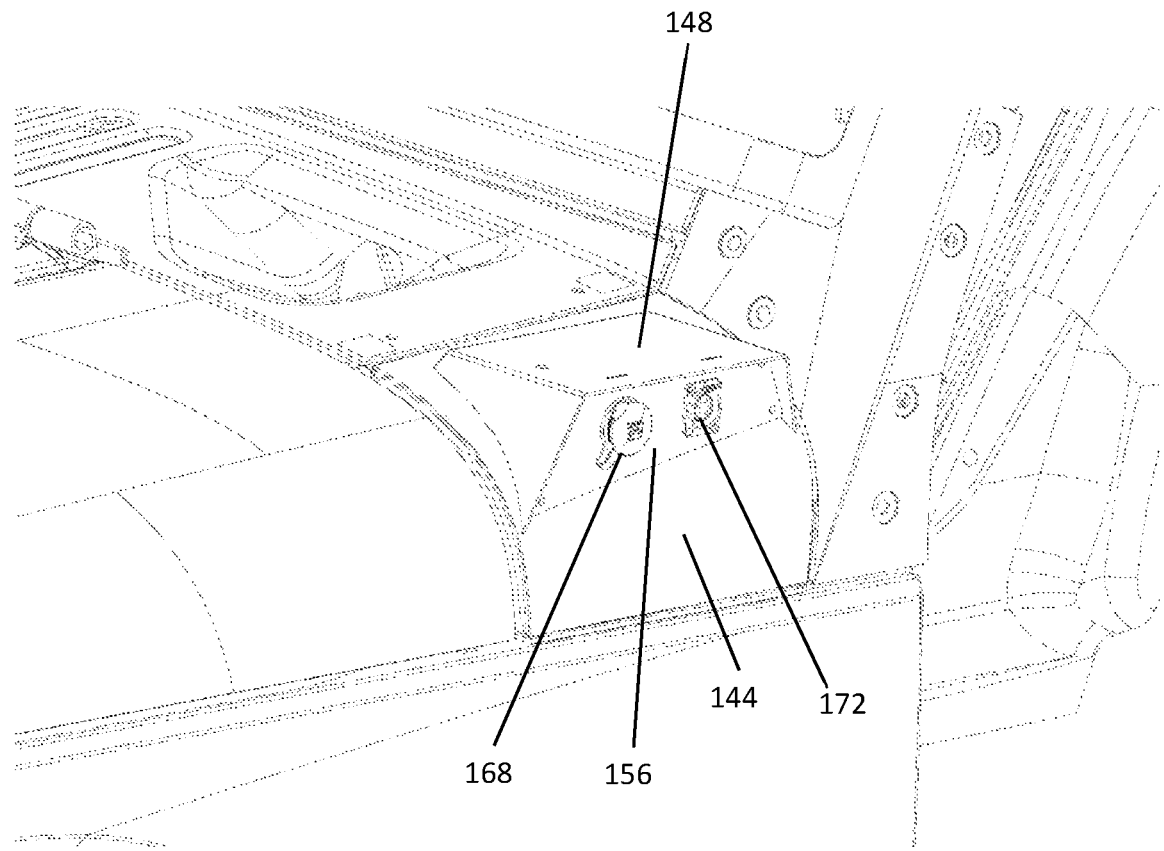
FIG. 15 is a perspective view of the SUV and upper fender of FIG. 12, with accessory ports installed.

Referring to FIG. 15, an accessory power port 168 (e.g. a 12V receptacle) and data communication ports 172 (e.g., a USB receptacle) may be mounted and wired to the cover member 156, thereby providing access to power and a datalink to accessories mounted on the mounting surface or elsewhere on the vehicle.

Figure 16:
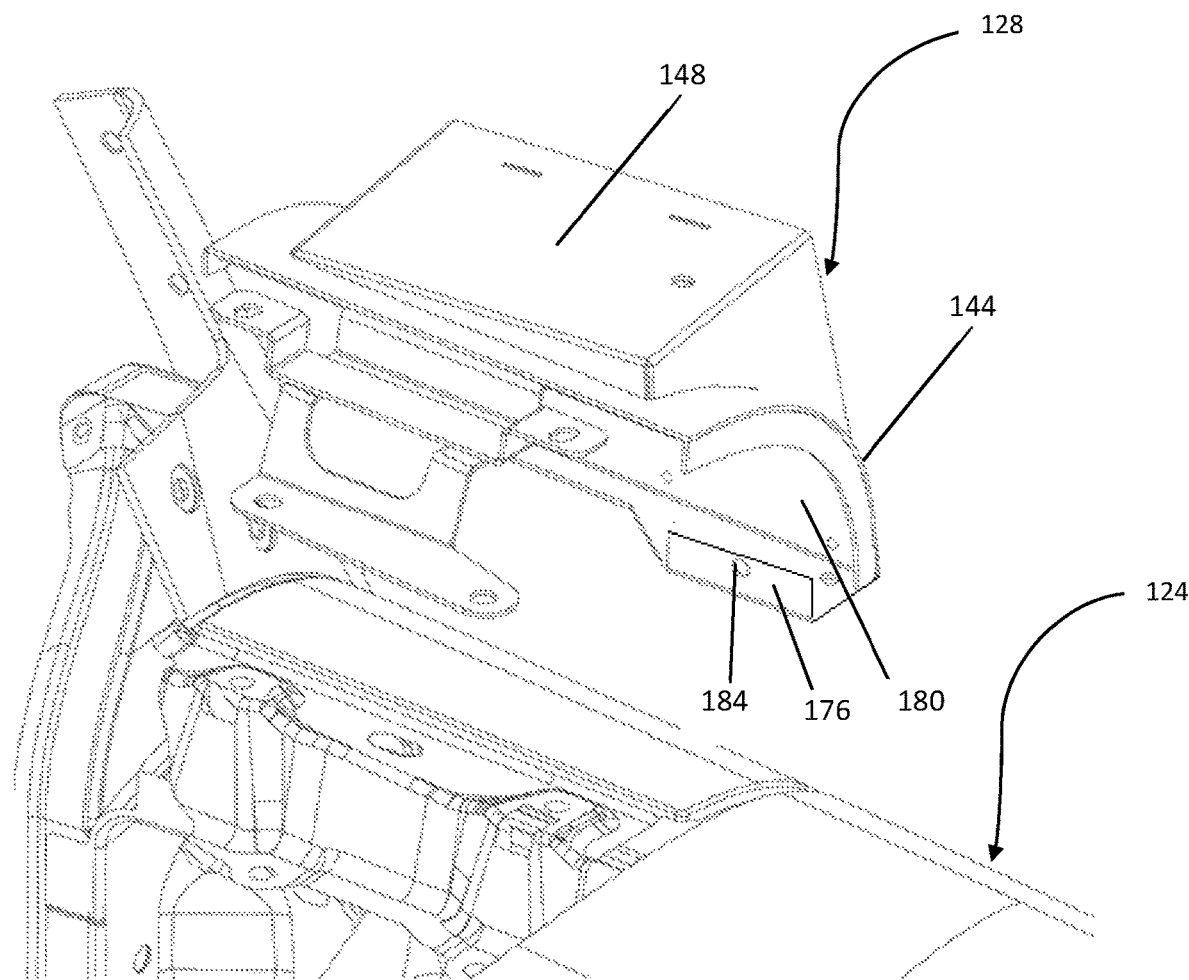
FIG. 16 is an exploded view of a portion of the SUV and the upper fender of FIG. 12.

Referring to FIG. 16, the multifunction upper fender assembly 128 is intended to replace an original equipment upper fender. Mounting tabs 176 on a backside 180 of the multifunction upper fender assembly 128 define mounting apertures 184. The mounting tabs 176 and mounting apertures 184 correspond to existing mounting points 188 defined in the frame and body of the SUV 124.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A bumper assembly for a vehicle having a frame, comprising:
   a winch cradle defining a cradle mounting aperture corresponding to a first frame aperture of the frame; and
   a bumper member configured to at least partially surround the winch cradle and extend laterally from the winch cradle across a portion of the vehicle, the bumper member defining a bumper mounting aperture corresponding to a second frame aperture;
   wherein the winch cradle is configured to couple to the vehicle frame independent of the bumper member and the bumper member is configured to couple to the vehicle frame independent of the winch cradle.

2. The bumper assembly of claim 1, further comprising a fascia member extending across an open portion of the bumper member to substantially enclose the winch cradle.

3. The bumper assembly of claim 2, wherein the fascia member is directly coupled to the bumper member.

4. The bumper assembly of claim 1, further comprising:
   a first fascia member configured to extend across an open portion of the bumper member to substantially enclose the winch cradle; and
   a second fascia member configured to extend across the open portion of the bumper member in the absence of the winch cradle.

5. The bumper assembly of claim 1, further comprising a fascia member configured to cover the bumper mounting aperture when the winch cradle is absent.

6. The bumper assembly of claim 1, wherein the bumper member is configured to receive a D-ring member coupled to the vehicle frame.

7. The bumper assembly of claim 1, wherein the bumper member is a front bumper member configured to be coupled to a front portion of a vehicle.

* * * * *